No. 878,597. PATENTED FEB. 11, 1908.
E. ANDERSON.
STRAIN EQUALIZER FOR GRAIN SHAKERS.
APPLICATION FILED AUG. 13, 1907.
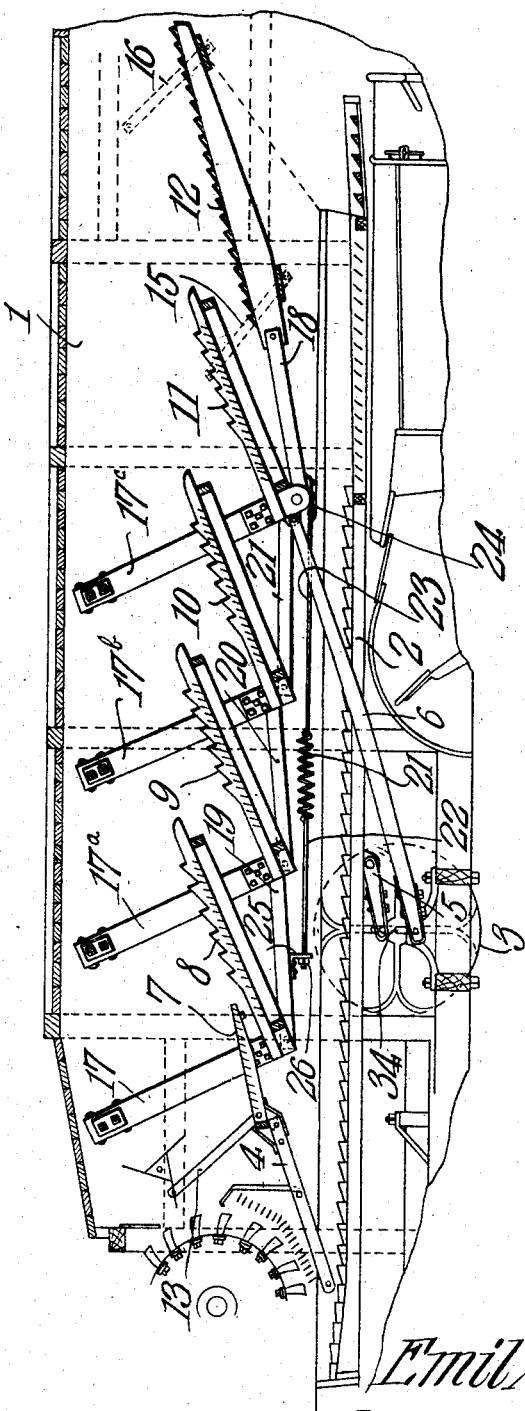
Witnesses:
Inventor,
Emil Anderson
By C. A. Snow & Co.
Attorneys.

UNITED STATES PATENT OFFICE.

EMIL ANDERSON, OF HASTINGS, NEBRASKA.

STRAIN-EQUALIZER FOR GRAIN-SHAKERS.

No. 878,597.          Specification of Letters Patent.          Patented Feb. 11, 1908.

Application filed August 13, 1907. Serial No. 388,363.

*To all whom it may concern:*

Be it known that I, EMIL ANDERSON, a citizen of the United States, residing at Hastings, in the county of Adams and State of Nebraska, have invented a new and useful Strain-Equalizer for Grain-Shakers, of which the following is a specification.

This invention relates generally to grain separators, and more particularly to the shaking mechanism thereof.

The object of the invention is in a ready, simple, and novel manner, to brace the series of shakers in such manner that the strain on the links connecting the series of shakers will be equalized, and racking and uneven wear of the shakers will thereby be positively prevented.

With the above and other objects in view, as will appear as the nature of the invention is better understood, the same consists in a novel strain equalizer for the shaking mechanism of a grain separator, as will be hereinafter fully described and claimed.

In the accompanying drawings, forming a part of this specification, and in which like characters of reference indicate corresponding parts: the figure is a view in vertical longitudinal section through a grain separator exhibiting as much of the operating mechanism thereof as is necessary to an understanding of the present invention.

Referring to the drawings, 1 designates one of the side walls of the casing, 2 the grain pan, 3 the driven or power wheel, 4 the crank shaft of the power wheel, 5 the pitman connecting the crank shaft and grain pan, and 6 the pitman connecting the crank shaft and the shakers. These parts are of the usual or any preferred construction, and therefore need no further description. In this instance, six shakers 7, 8, 9, 10, 11 and 12 are shown, of the usual construction, the rear shaker 7 being supported by hangers 13 (one only of which is shown) pivoted to the casing and to the shaker, and also by a pair of bars 14 (only one of which is shown), the upper ends of which are secured to the shaker 7 and the lower ends to the pan. The forward shaker 12 is supported by two pairs of hangers 15 and 16 (only one of each pair being shown) that as usual, are pivotally connected with the sides of the casing and with the shaker. The intermediate shakers 8, 9, 10 and 11 are supported by pairs of bars 17, 17$^a$, 17$^b$ and 17$^c$ (only one of each pair of which is shown), the upper ends of which are pivotally supported on the sides of the casing, and the lower ends of which have secured to them, in any preferred manner, the series of shakers 8—11. In order to transmit motion from the bar 17$^c$ to the shaker 12, a link 18 is employed, the forward end of which is pivotally connected with the shaker 12 and its rear end with the bar 17$^c$. The series of bars are connected by links 19, 20 and 21, said links being pivotally connected with the bars in the usual manner.

Thus far, the construction described is of the kind that is common to apparatus of this character, and may be of the character shown or otherwise.

The invention consists in providing means for equalizing the strain upon the series of links 19—21, whereby all will be subjected to the same amount of wear and tear. This result is secured by the employment of a tensioning device comprising a coiled spring 21 and two tensioning rods 22 and 23, the inner ends of the rods being combined in any preferred manner with the terminal whirls of the spring 21. The outer terminal of the rod 23 is secured to a plate 24 attached to the under side of the link 18, while the outer terminal of the rod 22 extends through a lug or bracket 25 bolted to the under side of the link 19 and carries a tensioning nut 26 by which the pull or tension of the spring 21 may be adjusted. It will be seen from this arrangement that there will be an equal inward draft or pull applied to the entire series of links, so that lost motion, unequal strain, and any tendency to loosening will be positively precluded. Furthermore, as the pivot or journals that connect the links with the bars 17 17$^c$ wear, this may be compensated for by tightening the tensioning nut 26.

Having thus described the invention what is claimed is:—

1. In a grain separator, a series of suspended shakers, links connecting each shaker with the one following, and a tensioning device connecting the two terminal links.

2. In a grain separator, a series of suspended shakers, links connecting each shaker with the one following, and an adjustable tensioning device connecting the two terminal links.

3. In a grain separator, a series of suspended shakers, links connecting each shaker with the one following, a coiled spring, and a pair of tensioning rods connected at their inner ends to the spring, the outer end of one of the rods being secured to one terminal link and the outer end of the other rod being adjustably connected with the other terminal link.

In testimony that I claim the foregoing as my own, I have hereto affixed my signature in the presence of two witnesses.

EMIL ANDERSON.

Witnesses:
C. I. VAN PATTEN,
J. D. HOUSER.